United States Patent [19]

Kobayashi

[11] Patent Number: 5,585,876
[45] Date of Patent: Dec. 17, 1996

[54] PHOTOGRAPHIC CAMERA

[75] Inventor: Kiyotaka Kobayashi, Saitama-ken, Japan

[73] Assignees: Fuji Photo Optical Co., Ltd., Saitama-ken; Fuji Photo Film Co., Ltd., Kanagawa-ken, both of Japan

[21] Appl. No.: 619,339

[22] Filed: Mar. 21, 1996

[30] Foreign Application Priority Data

Mar. 22, 1995 [JP] Japan .................................. 7-062973

[51] Int. Cl.⁶ ............................ G03B 17/02; G03B 17/26
[52] U.S. Cl. ......................... 396/440; 396/387; 396/516; 396/538
[58] Field of Search ................................. 354/203, 212, 354/288, 275

[56] References Cited

U.S. PATENT DOCUMENTS

| | | | |
|---|---|---|---|
| 5,363,166 | 11/1994 | Takahashi et al. | 354/288 |
| 5,521,668 | 5/1996 | Ezawa | 354/203 |

Primary Examiner—A. A. Mathews
Attorney, Agent, or Firm—Sixbey, Friedman, Leedom & Ferguson, P.C.; Gerald J. Ferguson, Jr.

[57] ABSTRACT

A photographic camera has a film cartridge chamber, a film take-up chamber, a film feed passage formed between a film window on a camera body and a pressure plate on a camera back and a film feed mechanism. A film cartridge in which a roll film is entirely rolled around a spool in a cartridge body to its leading end is loaded in the film cartridge chamber and the film is fed out through a film exit slit formed in the cartridge body by the film feed mechanism. A guide portion for leading the leading end of the film fed out through the film exit slit to the film feed passage is provided at the film cartridge chamber side end of the film feed passage. The guide portion includes at least an end guide surface provided on the camera body. A part of the guide portion including a corner portion between the end guide surface on the camera body and a surface of the camera body extending from the film window is formed of a smooth-faced gate member which is formed of a resin material containing therein no fiber, while the camera body is formed of a fiber-reinforced resin material.

5 Claims, 5 Drawing Sheets

PHOTOGRAPHIC CAMERA

BACKGROUND OF THE INVENTION

1. Field of the Invention

This invention relates to a structure of a photographic camera in which a thrust type film cartridge (a film cartridge in which a roll film is entirely rolled around a spool in a cartridge body to its leading end) is loaded.

2. Description of the Related Art

In conventional photographic cameras, a film cartridge in which a roll film is contained in a cartridge body with its leading end portion projecting outside the cartridge body is used. Recently there has been proposed a photographic camera in which a thrust type film cartridge is used as disclosed, for instance, in Japanese Unexamined Patent Publication No. 6(1994)-110124. A photographic camera of this type will be referred to as "a novel-type photographic camera", hereinbelow.

As shown in FIG. 6, the film cartridge 2 used in the novel-type photographic camera comprises a cartridge body 3 formed of resin molding halves bonded together and a photographic roll film entirely rolled around a spool 6 in the cartridge body 3 to its leading end. A film exit slit 10 is formed in the side surface of the cartridge body 3 and a shutter member 11 is supported for rotation in the film exit slit 10 to open and shut the film exit slit 10. The shutter member 11 extends in parallel to the spool 6 and is provided with a key 12 at its one end portion. The key 12 is exposed outward at one end face of the cartridge body 3 and the shutter member 11 is rotated between an opening position where it opens the film exit slit 10 and a shutting position where it shuts the same by way of an external shutter opening member which is adapted to be engaged with the key 12.

Opposite ends of the spool 6 are exposed outward at opposite end faces of the cartridge body 3 and are provided with keys 14. A drive mechanism on the camera side is brought into engagement with the keys 14 to drive the spool 6 to feed out and rewind the film.

Further, it has been proposed to provide a guide portion 50 for leading the film 8 fed out from the cartridge body 3 to a film feed passage 32 formed between a camera body 30 (film window) and a pressure plate 31 as shown in FIG. 7. The guide portion 50 comprises a film end guide surfaces 51 and 52 which are respectively formed on the camera body 30 and the pressure plate 31. The leading end of the film 8 is brought into abutment against the film end guide surface 51 on the camera body 30 and then led into the film feed passage 32 under the guide of the guide surface 51.

It is desired that the wall thickness of the camera body 30 be as small as possible in order to miniaturize the camera body. In order to reduce the wall thickness of the camera body without reducing the strength, there has been used fiber-reinforced resin containing therein a fiber material such as glass fiber. By using such fiber-reinforced resin, strength of members of the camera body is increased and the wall thickness of the moldings can be reduced, which is advantageous in compactly forming the camera body.

However with the film guide structure described above, there is a fear of the film surface scratching when the film 8 is guided into the film feed passage 32 by the guide portion 50.

That is, as shown in FIGS. 8 and 9, when the film 8 passes the guide portion 50 into the film feed passage 32, the film 8 runs on a corner portion 54 between the guide surface 51 of the guide portion 50 and the surface 53 of the camera body 30 opposed to the pressure plate 31. Further, upper and lower inner rails 30a are formed on the camera body 30 to extend along the film feed direction as shown in FIG. 9 and the film 8 runs waving between the pressure plate 31 and the camera body 30 due to curl of the film 8. Thus the film surface can be scratched by the edges of the inner rails 30a at the corner portion 54 as indicated at A in FIG. 10. That is, emulsion on the film surface can be scraped off along lines A.

Especially when the corner portion 54 is formed of fiber-reinforced resin, the film surface is more apt to be scratched by the fiber material exposed in the surface of the corner portion 54. The emulsion scraped off from the film can adhere to the other part of the film or can enter the cartridge body 3 and adhere to various parts in the cartridge body 3 when the film 8 is rewound, which can cause deterioration in quality of pictures and/or drop-out when writing magnetic information if the emulsion adheres to a magnetic head.

This phenomenon occurs when part of the surface of the camera body to be brought into contact with the film 8 is not smooth or when the fiber material is exposed in such part of the surface. Even if no fiber is exposed in the surface of the camera body as it is molded, the fiber material can come to be exposed when the surface is worn after repeated feed of film.

SUMMARY OF THE INVENTION

In view of the+foregoing observations and description, the primary object of the present invention is to provide a photographic camera in which scratching of the film surface due to contact of the film with the corner portion of the camera body can be prevented.

In a photographic camera in accordance with the present invention, a guide portion for leading the leading end of the film fed out through the film exit slit to the film feed passage is provided at the film cartridge chamber side end of the film feed passage, the guide portion including at least an end guide surface provided on the camera body, and a part of the guide portion including a corner portion between the end guide surface on the camera body and a surface of the camera body extending from the film window is formed of a smooth-faced gate member which is formed of a resin material containing therein no fiber.

It is preferred that the camera body be formed of a fiber-reinforced resin material.

It is further preferred that at least the surface of the gate member be formed of a low friction resin material.

Further it is preferred that the surface of the gate member facing the film feed passage be higher than the surface of the camera body facing the film feed passage at the junction therebetween so that no shoulder which can interfere with the leading end of the film in the film feed direction is formed.

In the photographic camera of the present invention, emulsion on the film surface is not scraped off and the film surface is not scratched since the surface of the corner portion is smooth and no fiber is exposed in the surface of the corner portion, whereby quality of the pictures taken can be ensured and various problems caused by emulsion scraped off the film can be prevented.

Further since the camera body except the gate member can be formed of a fiber-reinforced resin, the wall thickness of the camera body can be reduced, whereby the camera body can be small in size and weight. Further the resistance to feed of the film is reduced and the driving force can be reduced.

DESCRIPTION OF THE PREFERRED EMBODIMENT

Figure 1:
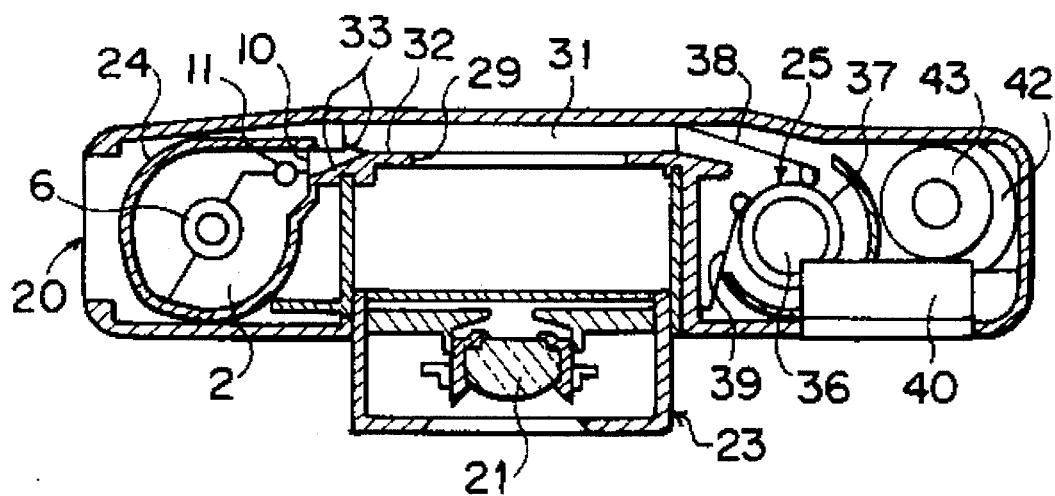
FIG. 1 is a horizontal cross-sectional view of a photographic camera in accordance with an embodiment of the present invention.
Figure 2:
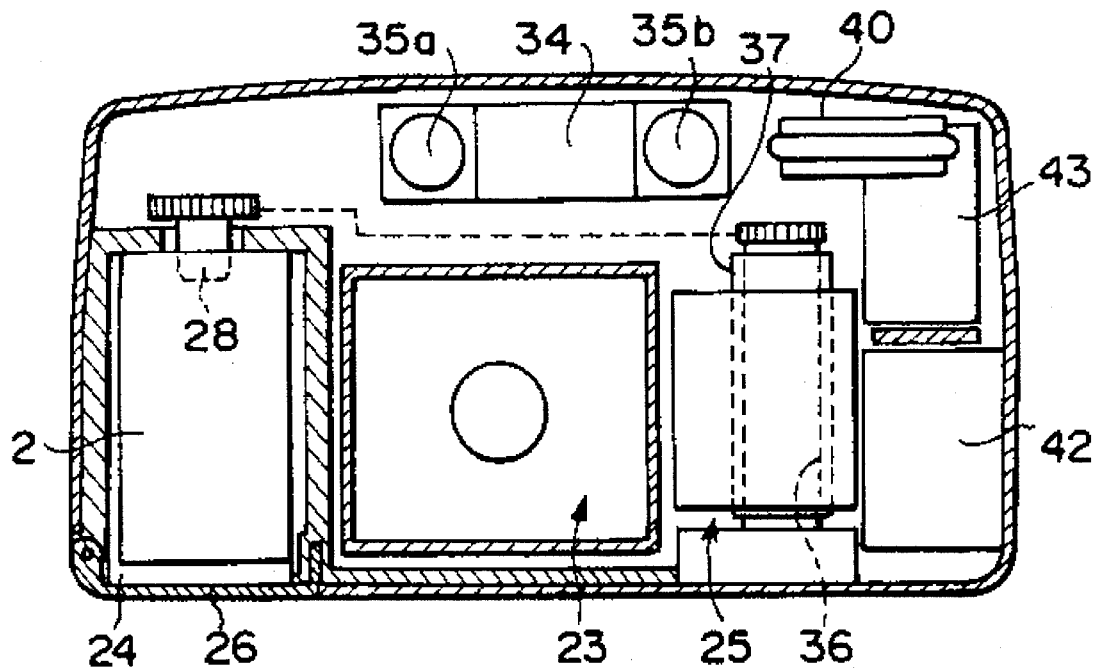
FIG. 2 is a vertical cross-sectional view of the camera.

In FIGS. 1 and 2, a camera body 20 is provided with an exposure unit 23 at its center and a cartridge chamber 24 and a film take-up chamber 25 on opposite sides of the exposure unit 23. In the exposure unit 23, a taking lens 21, a shutter mechanism and the like are incorporated. The exposure unit 23 is retractable in the direction of the optical axis of the taking lens 21 and is retracted when the camera is carried.

The film cartridge 2 is loaded in the cartridge chamber 24 with a bottom lid 26 opened. When the film cartridge 2 is loaded in the cartridge chamber 24, the spool 6 of the cartridge 2 is brought into engagement with a fork 28 of a drive mechanism and at the same time, the film cartridge 2 is positioned with respect to the cartridge chamber 24 in the vertical direction. Further the camera body 20 is provided with a shutter opening member (not shown) which engages with the key 12 of the shutter member 11 and opens and closes the shutter member 11.

A film window 29 formed integrally with the camera body 20 and a pressure plate 31 mounted on a camera back are disposed behind the exposure unit 23, and a film feed passage 32 is formed between the film window 29 and the pressure plate 31 to communicate the cartridge chamber 24 with the film take-up chamber 25. A guide portion 33 for guiding the leading end of the film 8 fed out from the cartridge body 3 to the film feed passage 32 is provided on the cartridge chamber side end of the film feed passage 32 to be opposed to the film exit slit 10 of the film cartridge 2. Further as shown in FIG. 2, a viewfinder 34 and a light projecting portion 35a and a light receiving portion 35b of an AF unit are disposed above the exposure unit 23.

A film take-up spool 37 driven by a motor 36 and a pair of film guide plates 38 and 39 which press the leading end of the film 8 against the film take-up spool 37 are provided in the film take-up chamber 25. The motor 36 drives the fork 28 by way of gears or the like to feed out and rewind the film 8. A light emitting portion 40, a capacitor 42 for strobe, a battery 42 and a strobe circuit board (not shown) are incorporated in the camera body 20 on the right side of the film take-up chamber 25.

Figure 3:
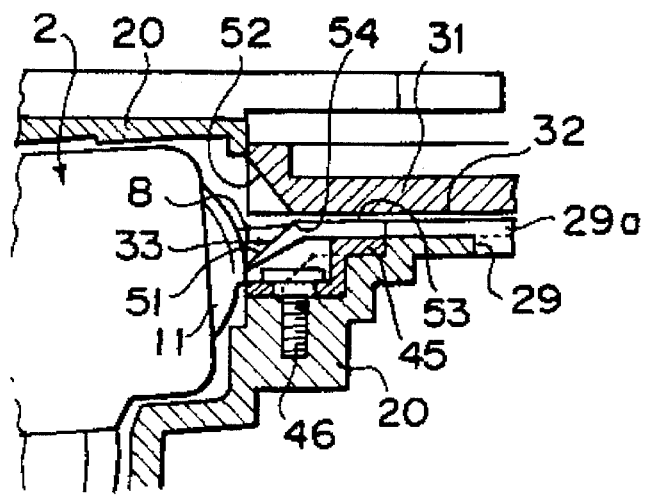
FIG. 3 is a fragmentary plan view partly in cross-section showing a part of the camera.

As shown in FIG. 3, the guide portion 33 comprises a guide surface 51 formed on the camera body 20 and a guide surface 52 formed on the pressure plate 31. The leading end of the film 8 fed out from the cartridge body 3 through the film exit slit 10 is inserted into the film feed passage 32 under the guide of the guide surfaces 51 and 52. The guide surfaces 51 and 52 may be inclined flat surfaces or curves surfaces. A part of the guide portion 33 including a corner portion 54 between the guide surface 51 and the surface 53 of the camera body 20 extending from the film window 29 is formed of a smooth-faced gate member 45 which is formed separately from the camera body 20 and is formed of a material other than the material of the camera body 20.

Figure 4:
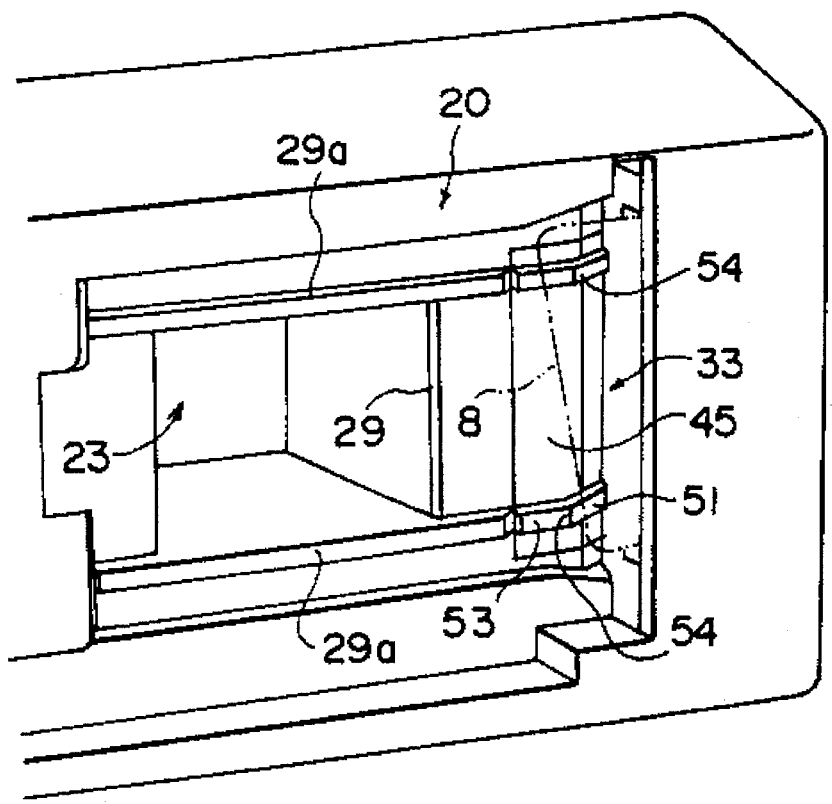
FIG. 4 is a perspective view of the camera as viewed from the rear side with the camera back removed.

As shown in FIG. 4, the film window 29 is formed behind the exposure unit 23 and a pair of inner rails 29a are disposed on upper and lower sides of the film window 29 to extend in the transverse direction. The rails 29a extend to the guide surface 51 of the gate member 45, and the surface of the gate member 45 including the corner portions 54 of the inner rails 29a are smooth-faced not to scratch the surface of the film 8. It is preferred that the surface of the gate member 45 be formed of a material low in friction.

The camera body 20 is formed, for instance, by molding of fiber-reinforced resin such as fiberglass reinforced polycarbonate resin or carbon fiber reinforced ploycarbonate resin. The gate member 45 is formed, for instance, by molding of polycarbonate resin or polyacetal resin without fiber. The polyacetal resin is excellent in lubricity. Further the gate member 45 may be of metal or resin coated with lubricant. The surface of the gate member 45 is resistant to wear against contact with the film 8 and is smooth (high in evenness) not to scrape off emulsion on the film 8.

The gate member 45 is fixed to the camera body 20 by means of screws 46 though it may be bonded to the camera body 20.

Figure 5:
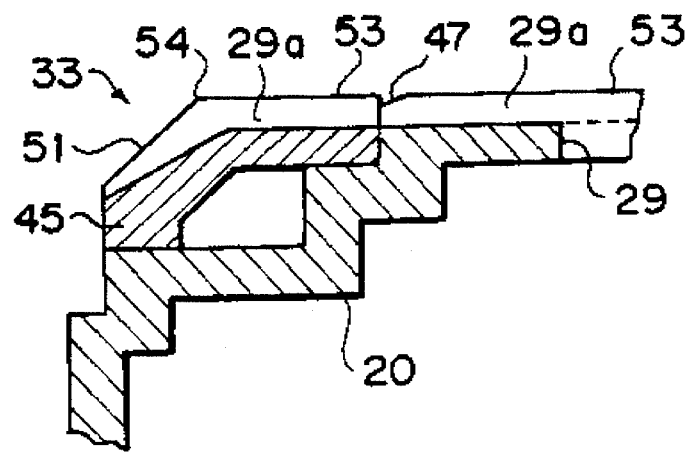
FIG. 5 is an enlarged fragmentary cross-sectional view of the camera.
Figure 6:
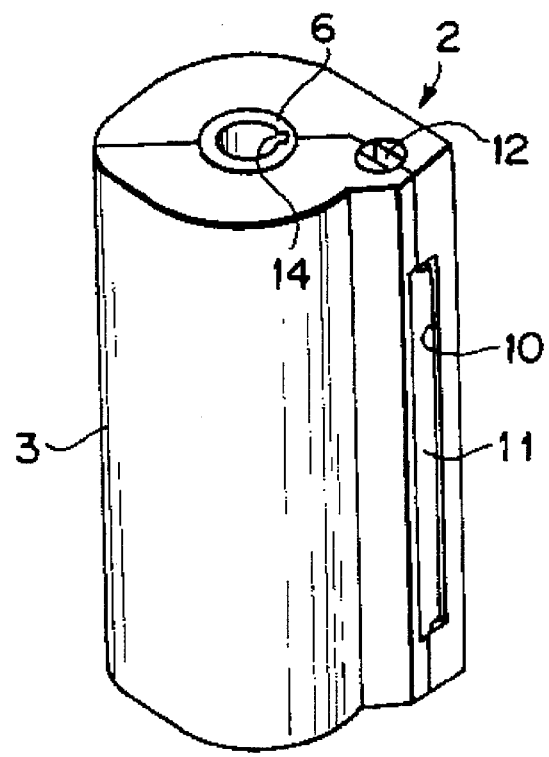
FIG. 6 is a perspective view of a film cartridge employed in the camera of the present invention.
Figure 7:
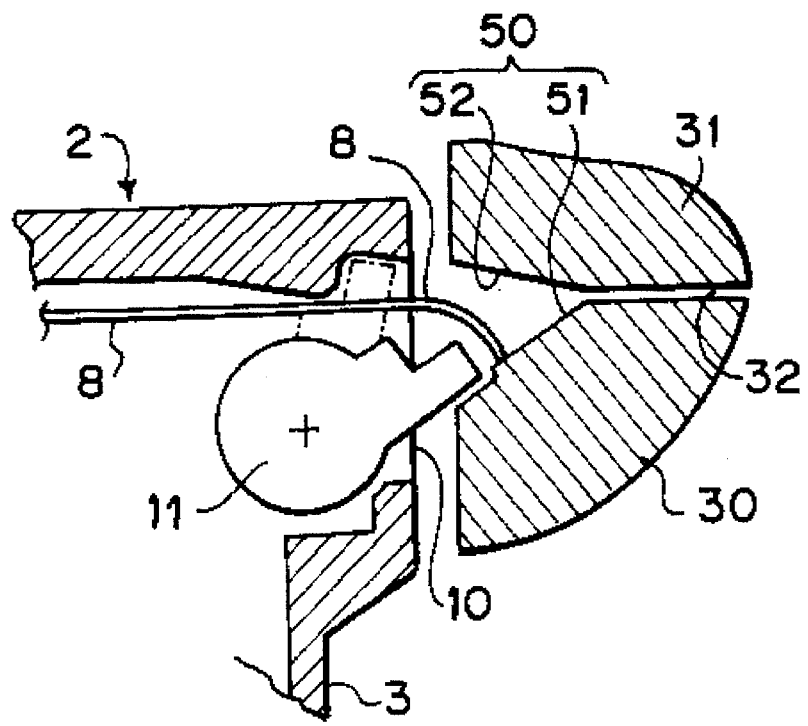
FIG. 7 is a cross-sectional view showing the film guide portion in the conventional camera.
Figure 8:
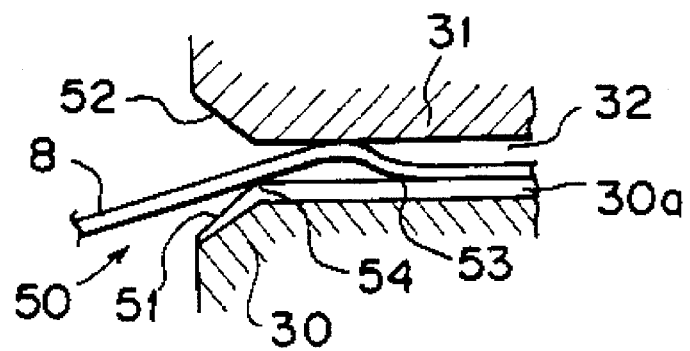
FIGS. 8 and 9 are views for illustrating the manner in which the film is guided.
Figure 9:
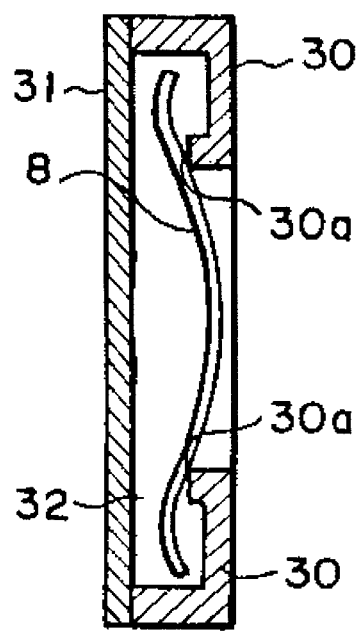
Figure 10:
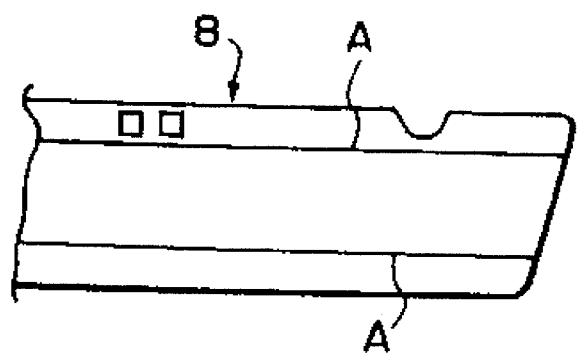
FIG. 10 is a front view of a film for illustrating an example of scratch on the film surface.

FIG. 5 shows the structure of junction between the gate member 45 and the camera body 20. As shown in FIG. 5, the junction between the surface 53 on the gate member 45 and the surface 53 on the camera body 20 is arranged not to form a shoulder or projection which can interfere with the leading end of the film 8 and prevent feed of the film 8. That is, an inclined surface 47 is formed in the camera body 20 at the junction side end portion so that the surface 53 on the camera body 20 does not become higher than the surface 53 on the gate member 45 even if the thickness of the gate member 45 or the camera body 20 fluctuates. It is preferred that the corner at the upper end of the inclined surface 47 be chamfered or rounded not to scratch the film surface.

When the film cartridge 2 is loaded in the cartridge chamber 24 and the bottom lid 26 is closed, the controller of the camera drives the shutter opening member to rotate the shutter member 11 to open the film exit slit 10. Then the controller drives the motor 36 to rotate the spool 6 in the film feed direction by way of the fork 28, whereby the leading end portion of the film 8 is fed out the cartridge body 3 through the film exit slit 10. Since the film 8 slightly curls so that the leading end is directed toward the camera body 20, the leading end of the film 8 is brought into abutment against the guide surface 51 on the gate member 45.

The leading end of the film 8 is smoothly led to the film feed passage 32 without being folded or jamming. When the leading end of the film 8 reaches film take-up chamber 25, the film 8 is pressed against the film take-up spool 37, which is rotating, by the film guides 38 and 39 and is wrapped around the spool 37. Thereafter the amount of film taken up by the take-up spool 37 becomes larger than that fed out by the fork 28 and the film 8 is taken up around the spool 37. When the first frame of the film 8 is brought to the film window 29, the take-up spool 37 is stopped. The operation thereafter is the same as in the conventional camera and accordingly will not be described here.

Even if the surface of the film 8 is brought into contact with the corner portion 54 of the gate member 45 during feed of the film 8, emulsion on the film surface is not scraped off and the film surface is not scratched since the surface of the corner portion 54 is smooth and no fiber is exposed in the surface of the corner portion 54, whereby quality of the pictures taken can be ensured and various problems caused by emulsion scraped off the film can be prevented.

The guide portion 33 may comprise only the guide surface on the camera body 20.

What is claimed is:

1. A photographic camera comprising a film cartridge chamber, a film take-up chamber, a film feed passage formed between a film window on a camera body and a pressure plate on a camera back and a film feed mechanism, a film cartridge in which a roll film is entirely rolled around a spool in a cartridge body to its leading end being loaded in the film cartridge chamber and the film being fed out through a film exit slit formed in the cartridge body by the film feed mechanism, characterized in that a guide portion for leading the leading end of the film fed out through the film exit slit to the film feed passage is provided at the film cartridge chamber side end of the film feed passage, the guide portion including at least an end guide surface provided on the camera body, and a part of the guide portion including a corner portion between the end guide surface on the camera body and a surface of the camera body extending from the film window is formed of a smooth-faced gate member which is formed of a resin material containing therein no fiber.

2. A photographic camera as defined in claim 1 in which said camera body is formed of a fiber-reinforced resin material.

3. A photographic camera as defined in claim 2 in which at least the surface of the gate member is formed of a low friction resin material.

4. A photographic camera as defined in claim 1 in which said guide portion comprises an end guide surfaces respectively formed on the camera body and the pressure plate.

5. A photographic camera as defined in claim 1 in which the surface of the gate member facing the film feed passage is higher than the surface of the camera body facing the film feed passage at the junction therebetween so that no shoulder which can interfere with the leading end of the film in the film feed direction is formed.

* * * * *